United States Patent
Kordjazi et al.

(10) Patent No.: US 11,175,973 B1
(45) Date of Patent: Nov. 16, 2021

(54) PREDICTION OF PERFORMANCE DEGRADATION WITH NON-LINEAR CHARACTERISTICS

(71) Applicant: International Business Machines Corporation, Armonk, NY (US)

(72) Inventors: Neda Kordjazi, Calgary (CA); Moshood Omolade Saliu, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/871,359

(22) Filed: May 11, 2020

(51) Int. Cl.
| | | |
|---|---|---|
| *G06F 11/00* | (2006.01) | |
| *G06K 9/62* | (2006.01) | |
| *G06Q 30/04* | (2012.01) | |
| *G06F 11/34* | (2006.01) | |
| *G06F 11/30* | (2006.01) | |

(52) U.S. Cl.
CPC .......... *G06F 11/008* (2013.01); *G06F 11/302* (2013.01); *G06F 11/3409* (2013.01); *G06K 9/6223* (2013.01); *G06K 9/6256* (2013.01); *G06Q 30/04* (2013.01)

(58) Field of Classification Search
CPC ... G06F 11/008; G06F 11/302; G06F 11/3409
See application file for complete search history.

(56) References Cited

U.S. PATENT DOCUMENTS

| | | |
|---|---|---|
| 9,292,799 B2 | 3/2016 | Liu et al. |
| 2012/0025997 A1 | 2/2012 | Liu et al. |

(Continued)

FOREIGN PATENT DOCUMENTS

| | | |
|---|---|---|
| CN | 110276416 A | 9/2019 |
| CN | 110570012 A | 12/2019 |
| WO | 2019136554 A1 | 7/2019 |

OTHER PUBLICATIONS

Moleda et al., "Predictive Maintenance of Boiler Feed Water Pumps Using SCADA Data" Jan. 20, 2020, Multidisciplinary Digital Publishing Institute (MDPI) (Year: 2020).*

(Continued)

*Primary Examiner* — Matthew M Kim
*Assistant Examiner* — Kyle Emanuele
(74) *Attorney, Agent, or Firm* — Stosch Sabo

(57) ABSTRACT

Described are techniques for predicting gradual performance degradation with non-linear characteristics. The techniques including a method comprising inputting a new data sample to a failure prediction model, wherein the failure prediction model is trained using a labeled historical dataset, wherein respective data points are associated with a look-back window and a prediction horizon to create respective training samples, wherein the respective training samples are clustered in a plurality of clusters, and wherein the plurality of clusters are each associated with a normalcy score and an anomaly score. The method further comprises outputting a classification associated with the new data sample based on comparing a first anomaly score of a first cluster of the plurality of clusters that includes the new data sample to an average anomaly score of clusters of the plurality of clusters having the normalcy score greater than the anomaly score.

25 Claims, 10 Drawing Sheets

(56) References Cited

U.S. PATENT DOCUMENTS

| | | |
|---|---|---|
| 2015/0112903 A1 | 4/2015 | Chan et al. |
| 2017/0096889 A1 | 4/2017 | Blanckaert et al. |
| 2018/0137427 A1 | 5/2018 | Hsieh et al. |
| 2021/0033066 A1* | 2/2021 | Beckerman ........... F03D 7/0296 |

OTHER PUBLICATIONS

Liu et al., "Automatic Early Fault Detection for Rod Pump Systems," SPE Annual Technical Conference and Exhibition 2011, 2 pages, Abstract Only.

Liu et al., "Well Failure Detection for Rod Pump Artificial Lift System Through Pattern Recognition," International Petroleum Technology Conference, 2013, 1 page, Abstract Only.

Guo et al., "Data Driven Approach to Failure Prediction for Electrical Submersible Pump Systems," SPE Western Regional Meeting, 2015, 2 pages, Abstract Only.

Sneed, J., "Predicting ESP Lifespans With Machine Learning," Proceedings of the 5th Unconventional Resources Technology Conference, 2017, 1 page, Abstract Only.

Unknown, "Industrial Strength AI-Based Failure Prediction, Anomaly Detection, And Predictive Maintenance For Oil and Gas Operators", Simularity Real Time Distributed Artificial Intelligence, Simularity, Inc., 2 pages (2016).

Liu et al., "Global Model for Failure Prediction for Rod Pump Artificial Lift Systems", SPE 165374, Apr. 19, 2013, 10 pages.

Mell et al., "The NIST Definition of Cloud Computing", Recommendations of the National Institute of Standards and Technology, Sep. 2011, 7 pages.

Notification of Transmittal of the International Search Report and the Written Opinion of the International Searching Authority, or the Declaration, International Application No. PCT/IB2021/053805, dated Aug. 12, 2021, 10 pages.

* cited by examiner

| 30 DAYS TO FAILURE 700-1 |||| 
|---|---|---|---|
| ACTUAL LABEL 702-1 | NORMAL | 0.76 | 0.24 |
| | FAULTY | 0.38 | 0.62 |
| | | NORMAL | FAULTY |
| | | PREDICTED LABEL 704-1 ||

| 14 DAYS TO FAILURE 700-2 ||||
|---|---|---|---|
| ACTUAL LABEL 702-2 | NORMAL | 0.76 | 0.24 |
| | FAULTY | 0.26 | 0.74 |
| | | NORMAL | FAULTY |
| | | PREDICTED LABEL 704-2 ||

| 5 DAYS TO FAILURE 700-3 ||||
|---|---|---|---|
| ACTUAL LABEL 702-3 | NORMAL | 0.76 | 0.24 |
| | FAULTY | 0.12 | 0.88 |
| | | NORMAL | FAULTY |
| | | PREDICTED LABEL 704-3 ||

FIG. 7

PREDICTION OF PERFORMANCE DEGRADATION WITH NON-LINEAR CHARACTERISTICS

BACKGROUND

The present disclosure relates to predictive modeling, and, more specifically, to prediction of performance degradation with non-linear characteristics.

Non-linear performance degradation can include phenomena related to the gradual deterioration of one or more mechanical systems or elements, where the gradual deterioration can ultimately result in a failure of, or permanent sub-optimal performance of, the one or more mechanical systems or elements. Such gradual deteriorations related to non-linear performance degradation can relate to any type of wear (e.g., weakening by gradual removal or deformation of a component based on its interaction with another substance), fatigue (e.g., weakening resulting from cyclical loading), creep (e.g., deformation resulting from persistent mechanical stresses), and/or other non-linear phenomena. The non-linear performance degradation can be induced by mechanical, chemical, thermal, or other stresses. For example, the phenomena of wear can include abrasive wear, erosive wear, corrosive wear, and other types of wear.

However, predicting non-linear performance degradation such as wear-induced deterioration presents many challenges. For one, wear is a gradual failure that progresses over an extended period of time. Accordingly, the relationship between normal and worn states is nonlinear which makes linear models (e.g., Naïve Bayes, Support Vector Machines (SVMs), etc.) inapplicable. Moreover, the progression of the wear failure between similar assets is highly variable (e.g., some assets fail in 50 days whereas others fail in 6 months) depending on, for example, usage characteristics. As one example, wear-related performance deterioration in progressing cavity pumps (PCPs) can depend on a number of factors such as, for example, the sub-surface geological formation type, sand granularity, and/or operating profile of any particular PCP. Thus, the level of performance degradation as a function of time-to-failure can vary at the same time-point across different assets based on a variety of operational factors.

Another challenge of predicting non-linear performance degradation relates to the imbalance between the normal and faulty operational states of an asset experiencing non-linear performance degradation such as wear-related performance deterioration. In other words, the majority (e.g., greater than 90%) of a training dataset comprises normal performance with very little data demonstrating faulty performance. Making accurate predictions from imbalanced training data is notoriously difficult. For example, utilizing highly parameterized nonlinear methods (e.g., Artificial Neural Networks (ANNs)) is not a sensible solution insofar as to be able to finely tune and optimize the massive number of parameters in an ANN, an abundance of data is needed (with enough examples of both classes). However, in cases where the data is highly imbalanced, the number of examples in the anomaly state are insufficient to effectively train an ANN. To remedy the issue of imbalanced data, over-sampling and/or under-sampling methods can be employed, however these methods can ultimately skew the original distribution in the data and thus bias the solution (e.g., decreased accuracy by virtue of increased false positive indications).

A further challenge related to accurately predicting non-linear performance degradation is that non-linear performance degradation such as wear-related performance deterioration is not necessarily a catastrophic failure. Returning again to the example of a PCP, a worn PCP will not necessarily stop working, although it will work sub-optimally due the wear on the rotor blades. This makes the "failure date" subjective to the operator's decision to replace the pump at a given level of performance degradation (as opposed to a catastrophic failure date). This, in turn, makes data labeling convoluted (e.g., determining when to label data from a PCP as failed when in reality the PCP continues to function at sub-standard performance).

Yet another challenge associated with predicting non-linear performance degradation in real-world applications relates to properly identifying a failure signature. This challenge is two-fold. First, the available data must be evaluated to identify failure signatures. This can involve inferring information from data that is not necessarily directly related to the non-linear performance degradation. For example, rarely are assets prone to wear-related performance deterioration explicitly instrumented to directly measure wear. Returning again to the example of PCPs, interactions between speed, production rate, torque, and casing pressure may be the only available information from which to infer a failure signature. Second, the exclusiveness of the identified failure signature must be evaluated. Said another way, the identified failure signature may be correlated with two or more phenomena, thus increasing false positives. In light of the above, it can be seen that non-linear performance degradation presents the further challenge of (i) identifying a failure signature from available data for a non-linear performance degradation, and (ii) determining if the identified failure signature is exclusively (or predominantly) representative of the non-linear performance degradation.

The combination of the aforementioned issues renders the problem of predictive modeling of non-linear performance degradation difficult to solve. Accordingly, there is a need for techniques that accurately predict performance degradation due to non-linear phenomena.

SUMMARY

Aspects of the present disclosure are directed toward a computer-implemented method comprising inputting a new data sample to a failure prediction model. The failure prediction model is trained using a labeled historical dataset. Respective data points are associated with a look-back window and a prediction horizon to create respective training samples. The respective training samples are clustered in a plurality of clusters, and the plurality of clusters are each associated with a normalcy score and an anomaly score. The method further comprises outputting a classification associated with the new data sample based on comparing a first anomaly score of a first cluster of the plurality of clusters that includes the new data sample to an average anomaly score of clusters in the plurality of clusters having the normalcy score greater than the anomaly score.

Advantageously, the aforementioned aspect of the present disclosure can accurately predict non-linear performance degradation from an imbalanced training dataset. Furthermore, the normalcy score and the anomaly score can advantageously quantify the degree of abnormality associated with the classification. A further advantage of the aforementioned aspect of the present disclosure is that it does not rely on ANNs (which are prone to over-parameterizing imbalanced training data) nor does it rely on over-sampling or under-sampling techniques of the imbalanced training data (which are prone to biasing classifications).

Another aspect of the present disclosure based on the above-described method further includes wherein the look-back window defines a quantity of sequentially previous data points to include in each respective training sample. Advantageously, the look-back window can moderate the size of feature signatures indicative of normal operations or abnormal operations. For example, a shorter look-back window may be more sensitive to individual data points, whereas a longer look-back window may be less sensitive to individual data points.

Another aspect of the present disclosure based on the above-described method further includes wherein the prediction horizon defines a predefined amount of time in the future, and wherein respective labels of respective data points the predefined amount of time in the future are associated with the respective training samples. Advantageously, the prediction horizon can link various feature signatures defined by the look-back window to a corresponding future outcome. For example, a shorter prediction horizon may give shorter warning for a given prediction (e.g., one day prior to a wear-related failure) whereas a longer prediction horizon may give lengthier warning for a given prediction (e.g., one month to a wear-related failure).

Another aspect of the present disclosure based on the above-described method further includes wherein the respective training samples are clustered using K-Means clustering. Advantageously, K-Means clustering is an efficient and scalable clustering technique.

Further aspects of the present disclosure are related to a computer-implemented method for predicting wear-related deterioration of progressing cavity pumps (PCPs), the method comprising inputting a new data sample of a PCP to a model configured to predict wear-related deterioration of the PCP. The model is trained using a labeled historical PCP dataset. Respective data points are associated with a look-back window and a prediction horizon to create respective training samples. The respective training samples are clustered in a plurality of clusters, and the plurality of clusters are each associated with a normalcy score and an anomaly score. The method further comprises outputting a classification associated with the new data sample based on comparing a first anomaly score of a first cluster of the plurality of clusters that includes the new data sample to an average anomaly score of clusters in the plurality of clusters having the normalcy score greater than the anomaly score, and where the classification is indicative of the wear-related deterioration of the PCP.

Advantageously, the aforementioned aspect of the present disclosure can accurately predict the non-linear performance degradation of wear-related deterioration in PCPs from an imbalanced training dataset of PCP-related data. Furthermore, the normalcy score and the anomaly score can advantageously quantify the degree of abnormality associated with the classification.

Further aspects of the present disclosure are related to a computer-implemented method for predicting wear-related deterioration of progressing cavity pumps (PCPs), the method comprises generating labeled historical data by performing binary labeling of historical data associated with one or more PCPs. The method further comprises generating a plurality of training data samples by applying a look-back window and a prediction horizon to respective data points of the labeled historical data. The method further comprises clustering the plurality of training data samples into a plurality of clusters. The method further comprises calculating cluster scores for respective clusters of the plurality of clusters. The method further comprises assigning a new data sample of a PCP to a first cluster of the plurality of clusters. The method further comprises assigning a classification to the new data sample based on cluster scores associated with the first cluster, wherein the classification is indicative of a likelihood of future wear-related deterioration of the PCP.

Advantageously, the aforementioned aspect of the present disclosure can accurately predict the non-linear performance degradation of wear-related deterioration in PCPs from an imbalanced training dataset of PCP-related data. Furthermore, the cluster scores can advantageously quantify the degree of abnormality associated with the classification.

Another aspect of the present disclosure based on the above-described method further includes wherein the labeled historical data is labeled as faulty for a predetermined period of time prior to a known pump replacement date. Advantageously, this aspect of the present disclosure provides a clear decision boundary between "normal" and "faulty" data whereas such a deterministic decision boundary does not necessarily otherwise exist due to the non-linear and gradual nature of wear-related deteriorations in performance.

Another aspect of the present disclosure based on the above-described method further includes wherein the historical data comprises pump speed data, pump torque data, casing pressure data, production rate data, and maintenance records related to the PCP.

Advantageously, this is the data that is available to PCPs. Said another way, by using this data to predict wear-related deteriorations in PCP performance, no additional data instrumentation is needed.

Another aspect of the present disclosure based on the above-described method further includes wherein calculating the cluster scores for the respective clusters further comprises calculating a normalcy score for the first cluster, wherein the normalcy score is a first proportion of training data samples associated with a normal state in the first cluster divided by a second proportion of training data samples associated with the normal state in the plurality of training data samples. Calculating the cluster scores further comprises calculating an anomaly score for the first cluster, wherein the anomaly score is a third proportion of training data samples associated with a deteriorated state in the first cluster divided by a fourth proportion of training data samples associated with the deteriorated state in the plurality of training data samples. Advantageously, calculating normalcy scores and anomaly scores quantifies the relative degree of abnormality of predicted classifications, thus lending additional accuracy and context to the classifications.

Another aspect of the present disclosure based on the above-described method further includes generating a failure signal for the new data sample, wherein the failure signal comprises an average anomaly score for the new sample over a predetermined number of prior data points. Advantageously, the failure signal represents a post-processed smoothing of anomaly scores for a given data sample, thereby reducing false positives and/or noise in sequential anomaly scores for a stream of data.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 illustrates experimental results of confusion matrices for various periods prior to failure, in accordance with some embodiments of the present disclosure.

Figure 1:
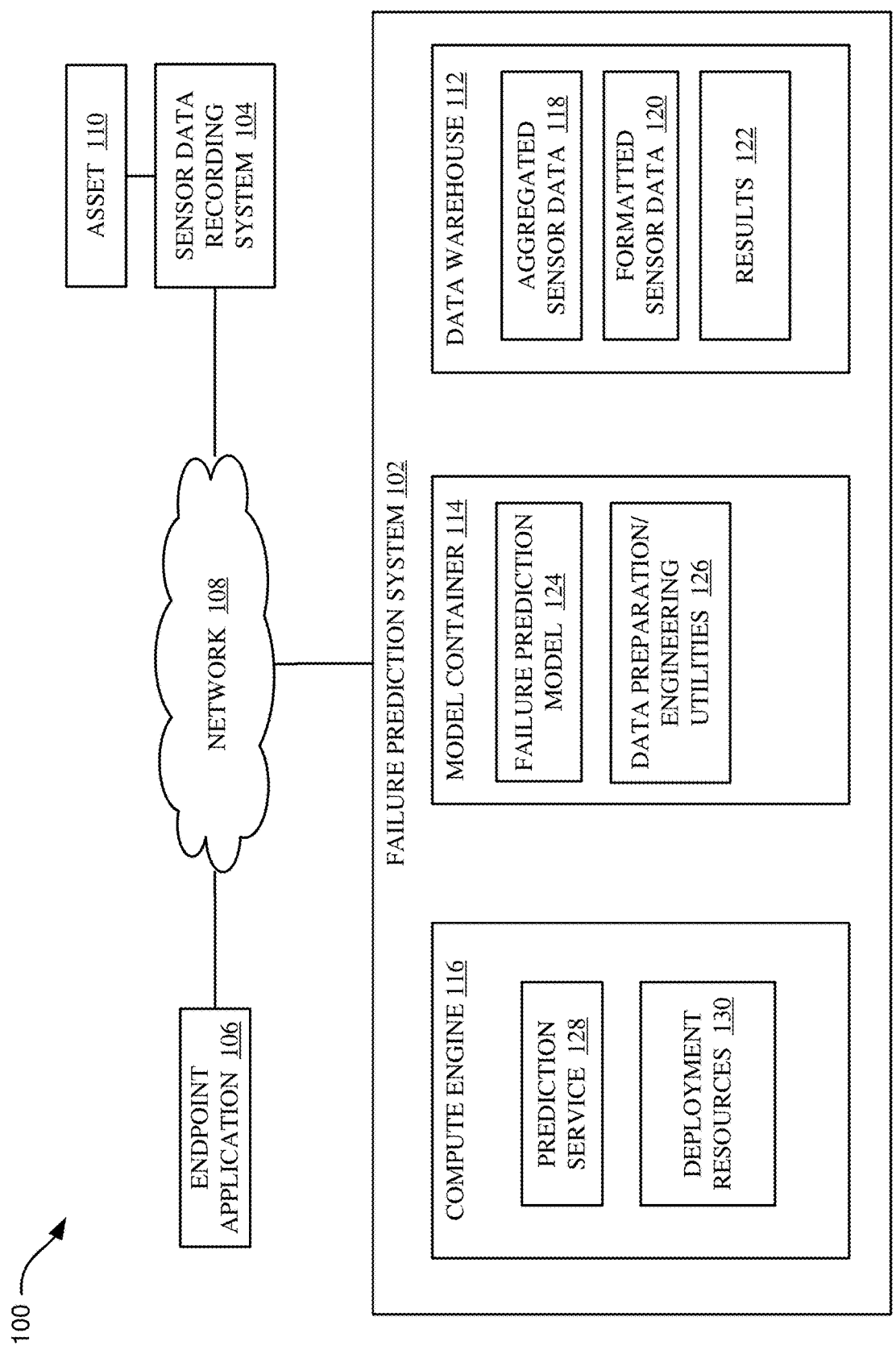
FIG. 1 illustrates a block diagram of an example computational environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward predictive modeling, and, more specifically, to prediction of performance degradation with non-linear characteristics. While not limited to such applications, embodiments of the present disclosure may be better understood in light of the aforementioned context.

Aspects of the present disclosure are directed toward techniques for detecting degradation in asset performance during the early stages of a non-linear failure mechanism (e.g., wear, fatigue, creep, etc.) to predict upcoming failure of the asset and recommend preventative maintenance of the asset prior to its failure. Aspects of the present disclosure leverage a semi-supervised machine learning method that ingests as input historical data of the asset and generates as output an anomaly score, classification, and/or failure signal indicative of a likelihood of future failure or performance degradation of the asset.

In overcoming the previously discussed challenges in predictive modeling of non-linear phenomena, aspects of the present disclosure realize features such as, but not limited to: (i) a non-linear decision boundary differentiating normal and faulty data; (ii) a computationally straightforward implementation (e.g., despite non-linearity, it is not over-parametrized as may be the case with ANNs); (iii) no class balancing (and thus, no skewing of the original distribution in the data and subsequently biasing of the solution); and/or (iv) a global solution that can readily be applied to any family of similar assets.

Referring now to the figures, FIG. 1 illustrates an example computational environment 100, in accordance with some embodiments of the present disclosure. The computational environment 100 includes a failure prediction system 102 communicatively coupled to a sensor data recording system 104 and an endpoint application 106 via a network 108. The failure prediction system 102 can be configured to receive data from the sensor data recording system 104 and make a prediction related to a future deterioration in performance of an associated asset 110 due to a non-linear phenomenon (e.g., a prediction of wear-related performance deterioration of PCP in a future time interval). The failure prediction system 102 can be further configured to interact with endpoint application 106. For example, the failure prediction system 102 can receive a request from endpoint application 106 to detect any indication of failure from the sensor data recording system 104. As another example, the failure prediction system 102 can push updates to the endpoint application 106 regarding potential failure signatures identified from the sensor data recording system 104.

The sensor data recording system 104 can comprise one or more data acquisition systems configured to acquire data that is directly or indirectly related to the functionality of an asset 110. For example, where the asset 110 is a PCP in an oil well production system, the sensor data recording system 104 can collect data such as, but not limited to, speed, torque, casing pressure, and/or production rate. As another example, where the asset 110 is a mechanical component (e.g., fuel pump, wheel bearings, head gasket, etc.) of a vehicle, the sensor data recording system 104 can collect data such as, but not limited to, mileage, speed, engine error codes, and the like. As can be seen from these two non-limiting examples, the sensor data recording system 104 need not necessarily collect data directly associated with the asset 110. To the contrary, in some embodiments, the sensor data recording system 104 collects data associated with other components that are associated with the asset 110, but where the collected data may nonetheless be useful for providing indirect inferences about the functionality of the asset 110. This can be beneficial insofar as instrumenting specific components of a system for collecting data to predict non-linear performance degradation may be economically infeasible and/or technically impractical. Thus, in many real-world applications, prediction of non-linear performance degradation includes the challenges of (i) identifying a failure signature from available data for a non-linear performance degradation, and (ii) determining if the identified failure signature is exclusively (or predominantly) representative of the non-linear performance degradation.

Endpoint application 106 can be an application executed on a user workstation such as, for example, a desktop, laptop, tablet, smartphone, or other endpoint device. The endpoint application 106 can provide an interface for a user to interact with failure prediction system 102. For example, a user can request predictive failure analytics for an asset 110 based on data from the sensor data recording system 104. As another example, failure prediction system 102 can push updates, notifications, or warnings to the endpoint application 106 based on a failure signature associated with the asset 110 and detected from data from the sensor data recording system 104. Furthermore, in some embodiments, the endpoint application 106 provides a mechanism by which a user can configure an already trained failure prediction system 102 to receive streaming data, where the streaming data can be for a similar asset as the asset 110 used to train the failure prediction system 102 (e.g., an oil well operator may stream their own PCP data to the failure prediction system 102 that is previously trained on similar PCP data from one or more other PCPs).

The failure prediction system 102 can, in some embodiments, be virtually provisioned in a cloud computing architecture. In some embodiments, the failure prediction system 102 can reside in computer such as, for example, a mainframe, a compute node, a desktop, a laptop, a tablet, or another system including one or more processors and one or more computer-readable storage media.

The failure prediction system 102 can include a data warehouse 112, a model container 114, and a compute engine 116. The data warehouse 112 can include aggregated sensor data 118 which can be data that is collected from the sensor data recording system 104 and can comprise one or more samples of data.

The model container 114 can include data preparation/engineering utilities 126 which can be executed on the aggregated sensor data 118 to generate, at least in part, the formatted sensor data 120. For example, the data preparation/engineering utilities 126 can be configured to remove outliers, correct data formatting issues, resolve null values, and the like when converting the aggregated sensor data 118 to formatted sensor data 120. In some embodiments, the formatted sensor data 120 can, for example, include a look-back window applied to the aggregated sensor data 118.

The formatted sensor data 120 can be input to the failure prediction model 124. In some embodiments, the formatted sensor data 120 and the failure prediction model 124 are loaded into deployment resources 130 of the compute engine 116. After execution of the failure prediction model 124 using the formatted sensor data 120 as input, the compute engine 116 can generate results 122 and store the results 122 in the data warehouse 112. The results 122 can include, for example, an anomaly score, a classification, and/or a failure signal. The results 122 can be indicative of a likelihood of future deteriorated performance due to non-linear performance degradation (e.g., a likelihood of wear-related performance deterioration in a PCP).

The compute engine 116 can further include a prediction service 128, where the prediction service 128 can be configured to receive requests from, or push notifications to, the endpoint application 106. The prediction service 128 can orchestrate the functioning of the failure prediction system 102. For example, in some embodiments, the prediction service 128 can cause the data preparation/engineering utilities 126 to be executed against the aggregated sensor data 118 using the deployment resources 130 for the purposes of generating the formatted sensor data 120. Continuing with the above example, the prediction service 128 can be further configured to deploy the failure prediction model 124 on the deployment resources 130 and using the formatted sensor data 120 as input in order to generate the results 122. The prediction service 128 can be further configured to transmit the results 122 to the endpoint application 106.

Figure 2:
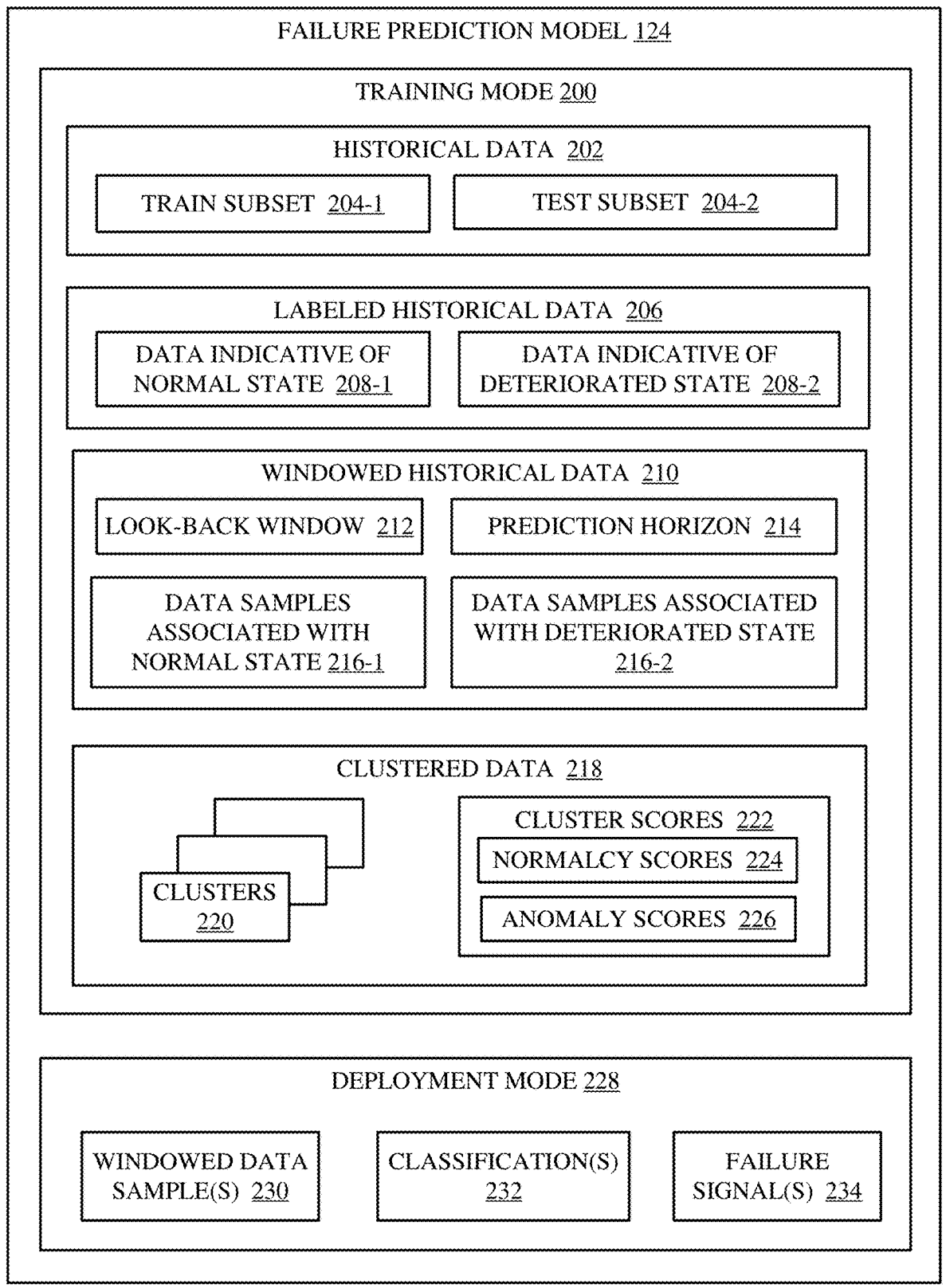
FIG. 2 illustrates a block diagram of an example failure prediction model, in accordance with some embodiments of the present disclosure.

Turning now to FIG. 2, illustrated is a block diagram of the failure prediction model 124, in accordance with some embodiments of the present disclosure. The failure prediction model 124 can include, for example, a training mode 200 and a deployment mode 228. In the training mode 200, the failure prediction model 124 is trained to accurately predict non-linear performance degradation such as failures or degradations due to wear. In the deployment mode 228, the failure prediction model 124 is configured to receive input data, format the input data, and make a prediction related to the non-linear phenomenon associated with the data (e.g., such as a prediction of future sub-optimal performance due to wear in a PCP).

In the training mode 200, the failure prediction model 124 can receive historical data 202 from one or more sensor data recording systems 104 associated with one or more assets 110, where the historical data 202 is segmented into a train subset 204-1 and a test subset 204-2. The train subset 204-1 can be configured to train and validate the failure prediction model 124, and the test subset 204-2 can be used to test the failure prediction model 124, where testing can be used to quantify characteristics of the failure prediction model 124 such as, for example, accuracy, precision, recall, and so on.

The training mode 200 can further include labeled historical data 206, where the labeled historical data 206 can be derived from time-aligning historical failure records (e.g., maintenance records indicating PCP replacements) with sensor readings (e.g., speed, torque, production rate, casing pressure, etc.). The labeled historical data 206 includes data indicative of a normal state 208-1 indicating normal operation of the asset 110 and data indicative of a deteriorated state 208-2 indicating sub-optimal, deteriorating, or failed performance of the asset 110 (e.g., a worn state of a PCP). The decision boundary between data indicating a normal state 208-1 and data indicating a deteriorated state 208-2 can be subjectively made by a subject matter expert (SME), objectively made by a statistical measure (e.g., outside of one standard deviation of a mean during normal operation), deduced from machine learning, or determined using other strategies or techniques. As previously discussed, the data indicating a deteriorated state 208-2 need not necessarily be data associated with the asset 110 not functioning. Rather, the data indicating a deteriorated state 208-2 indicates sub-optimal performance of the asset 110 even if the asset 110 remains functional. For example, in some embodiments, if an asset 110 experiences an explicit failure or is otherwise replaced on day x, then data from a predetermined period prior to day x can automatically be labeled as data indicative of a deteriorated state 208-2.

The training mode 200 can further include windowed historical data 210. The windowed historical data 210 can include a look-back window 212 and a prediction horizon 214. The look-back window 212 can refer to a number of data points (e.g., $D_x$) prior to the current data point to include in each data sample. The prediction horizon 214 can refer to a label of a data point a number of data points in the future (e.g., $D_y$) from the current data point. The look-back window 212 and the prediction horizon 214 can be used to convert respective data points in the train subset 204-1 to respective data samples associated with a normal state 216-1 and respective data samples associated with a deteriorated state 216-2 (collectively referred to as data samples 216). In other words, the failure prediction model 124 is trained to use a history of performance of an asset 110 (equal to the look-back window 212) to make conclusions about the possible future state of the asset 110 regarding a level of deterioration in performance. Respective data samples 216 can comprise a vector, matrix, or tensor of data points corresponding to, for each data stream, a current data point and several previous data points (based on the look-back window 212), and the respective data samples 216 can further be associated with a label of a data point in the future by the prediction horizon 214 (where the label of the data point in the future can be added to a predetermined position in the vector, matrix, or tensor, or otherwise associated with the vector, matrix, or tensor). In other words, data samples associated with a normal state 216-1 can be identified by a data point at the prediction horizon 214 that is data indicative of a normal state 208-1. Similarly, data samples associated with a deteriorated state 216-2 can be those data samples having a data point at the prediction horizon 214 that is labeled as data indicative of a deteriorated state 208-2.

For example, the look-back window 212 can be ten days and the prediction horizon 214 can be twenty days. In this scenario, for a data point at a first time from a single stream of data in the train subset 204-1, the data point can be converted to a vector including the previous ten data points (e.g., the look-back window 212) and the vector can be associated with the label of the data point twenty days in the future (e.g., the prediction horizon 214, where the label is either data indicative of a normal state 208-1 or data indicative of a deteriorated state 208-2). In this example, if the label of the data point twenty days in the future is data indicative of a deteriorated state 208-2, the vector of data points of the current data point and the previous ten data points can be considered a predictive failure signature for training purposes. Conversely, if the label of the data point twenty days in the future is data indicative of a normal state 208-1, the vector of data points of the current data point and the previous ten data points can be assumed to be a predictive normal signature for training purposes.

As will be appreciated by one skilled in the art, the look-back window 212 and the prediction horizon 214 can be a variety of numbers according to a variety of scales. For example, in some embodiments, the look-back window 212 and the prediction horizon 214 can be measured in seconds, minutes, days, weeks, months, and so on. In various embodiments, the look-back window 212 is less than, greater than, or equal to the prediction horizon 214. In some embodiments, the look-back window 212 is sized to manage the trade-off between utility and computational overhead. For example, a relatively larger look-back window 212 provides increased information with which to accurately detect a failure signature while also requiring additional computational capacity to implement. Conversely, a relatively smaller look-back window 212 provides decreased information with which to accurately detect a failure signature while requiring less computational capacity to implement. In some embodiments, the prediction horizon 214 is sized based on the failure signature. For example, if an asset 110 is associated with a twenty-day window from the time an indication of failure begins manifesting itself in the data, then the prediction horizon 214 must be twenty days or less (in other words, a prediction horizon 214 greater than twenty days would result in increased false positives). Furthermore, in some embodiments, the look-back window 212 and the prediction horizon 214 need not necessarily be measured in time-based increments at all, but can simply be referred to by a number of previous or subsequent data points where the spacing of the data points may be based on non-temporal characteristics. Further still, although data samples 216 discussed in the above example are in vector format, in other embodiments matrices or tensors can be used to represent multi-dimensional data or multi-modal data streams. As one example, for an asset 110 that is associated with three data streams, a data sample 216 can include an input-output data pair where the input portion comprises a three-dimensional tensor made up of respective look-back window 212 samples for each of the three data streams, and where the output portion comprises a binary indicator of future performance at the prediction horizon 214 (e.g., 0 for normal and 1 for failure).

The training mode 200 can further include clustering the data 218. Clustering 218 can cluster the data samples 216 using any testable clustering technique now known or later developed. In other words, the clustered data 218 can include a plurality of clusters 220, where each cluster contains at least one data sample 216. Notably, the number of clusters 220 is configurable in order to accurately fit (without overfitting) the data samples 216.

In some embodiments, the clusters 220 are determined by using K-Means clustering. Advantageously, K-Means clustering is a computationally efficient clustering technique that is scalable to large sets of data. More generally, the type of clustering technique used, the number of clusters used, and the parameters of the clusters used (e.g., shape, size, etc.) are all tunable parameters that can be moderated as necessary to improve performance of the failure prediction model 124, in accordance with some embodiments of the present disclosure. For example, it may be beneficial to have a sufficient number of clusters to capture a variety of normal operational profiles and a variety of deteriorating operational profiles.

The clustered data 218 can further include cluster scores 222 assigned to each of the clusters 220. Cluster scores 222 can include normalcy scores 224 and anomaly scores 226. In some embodiments, normalcy scores 224 can be calculated according to Equation 1:

$$NS_{C_i} = \frac{N_n^{C_i}/N^{C_i}}{N_n/N} \text{ for } 1 < i < \text{Number of clusters} \qquad \text{Equation 1}$$

Similarly, in some embodiments, anomaly scores 226 can be calculated according to Equation 2:

$$AS_{C_i} = \frac{N_f^{C_i}/N^{C_i}}{N_f/N} \text{ for } 1 < i < \text{Number of clusters} \qquad \text{Equation 2}$$

Regarding Equation 1, $N_n^{C_i}$ can refer to the count of data samples associated with a normal state 216-1 within a given cluster $C_i$ of clusters 220 while $N_n$ can refer to the total count of data samples associated with a normal state 216-1 in the windowed historical data 210. Similarly, regarding Equation 2, the term $N_f^{C_i}$ can refer to the count of data samples associated with a deteriorated state 216-2 within a given cluster $C_i$ of clusters 220 while $N_f$ can refer to the total count of data samples associated with a deteriorated state 216-2 in the windowed historical data 210. For both Equation 1 and Equation 2, the term $N^{C_i}$ can refer to the total count of data samples 216 within a given cluster $C_i$ of clusters 220 while N can refer to the total count of data samples 216 in the windowed historical data 206.

Said another way, the normalcy score 224 can be the proportion of data samples associated with a normal state 216-1 in a given cluster divided by the proportion of data samples associated with a normal state 216-1 in the entire windowed historical data 210. Similarly, the anomaly score 226 can be the proportion of data samples associated with a deteriorated state 216-2 in a given cluster divided by the proportion of the data samples associated with the deteriorated state 216-2 in the entire windowed historical data 210.

After creating the clusters 220 and generating the cluster scores 222, the failure prediction model 124 can be considered trained. In some embodiments, after training the failure prediction model 124 using the train subset 204-1, the failure prediction model 124 can be tested using the test subset 204-2 and the deployment mode 228. Although the discussion of deployment mode 228 will be discussed with respect to the train subset 204-2, the discussion of deployment mode 228 is equally applicable to receiving streaming real-time data for the purposes of predicting a future non-linear phenomenon (e.g., wear-related performance deterioration in a PCP) associated with the new data.

In deployment mode 228, the failure prediction model 124 can format the test subset 204-2 into windowed data samples 230. Windowed data samples 230 can be similar to data samples 216 but without any indication of a normal state or deteriorated state (insofar as this is the information to be predicted by the failure prediction model 124 and is thus hidden from the failure prediction model 124 while testing performance of the failure prediction model 124). Thus, a respective sample in windowed data samples 230 can include a data point from the test subset 204-2 and a previous number of data points according to the look-back window 212. As previously discussed, this series of data can be stored in a vector, matrix, or tensor format depending on the complexity, dimensionality, and modality of the data in the test subset 204-2. In some embodiments windowed data samples 230 are consistent with formatted sensor data 120.

Respective samples of the windowed data samples 230 can then be associated with respective clusters 220. A classification 232 can then be associated with each of the windowed data samples 230 based on an associated cluster of the clusters 220. For example, for a respective windowed data sample 230 that is placed within a respective cluster 220 having a normalcy score 224 greater than an anomaly score 226, that respective windowed data sample 230 can be considered normal (e.g., a "0" score). Conversely, if that respective windowed data sample 230 is placed in a respective cluster 220 having an anomaly score 226 that is greater than the normalcy score 224, then that respective windowed data sample 240 can be considered anomalous or predictive of a future failure (e.g., a "1" score). In some embodiments, the classification 232 includes comparing an anomaly score 226 of a cluster 220 capturing a windowed data sample 230 to an average anomaly score of all clusters 220 having a normalcy score 224 greater than an anomaly score 226. In this way, the anomaly score 226 of the cluster 220 capturing the windowed data sample 230 can be compared to a baseline level of abnormality seen in other clusters 220 otherwise considered normal.

The failure prediction model 124 can further include a failure signal 234. The failure signal 234 can be configured to smooth the anomaly scores 226 or classifications 232 by acquiring a mean of anomaly scores for a previous predetermined number of data points. For example, the failure signal 234 can be calculated according to Equation 3:

$$FS_t = \frac{\sum_{n=t-x}^{t} AS_n}{x} \quad \text{Equation 3}$$

In Equation 3, the term x can refer to a predetermined number of sequentially prior data points over which to determine the mean anomaly score for a given windowed data sample 230. In some embodiments, x can be a tunable parameter according to the design considerations of the failure prediction model 124. For example, a relatively larger x may reduce the sensitivity of the failure prediction model 124 to any particular anomaly score indicating failure (and thereby reduce false positives), whereas a relatively smaller x may increase the sensitivity of the failure prediction model 124 to each anomaly score indicating failure (and thereby reduce false negatives). Further in Equation 3, the term $AS_n$ can refer to the anomaly score 226 for a cluster of clusters 220 that includes data point n, though in other embodiments, the classification 232 could also be used. The failure signal 234 is discussed in more detail with respect to FIG. 5B.

Figure 3:
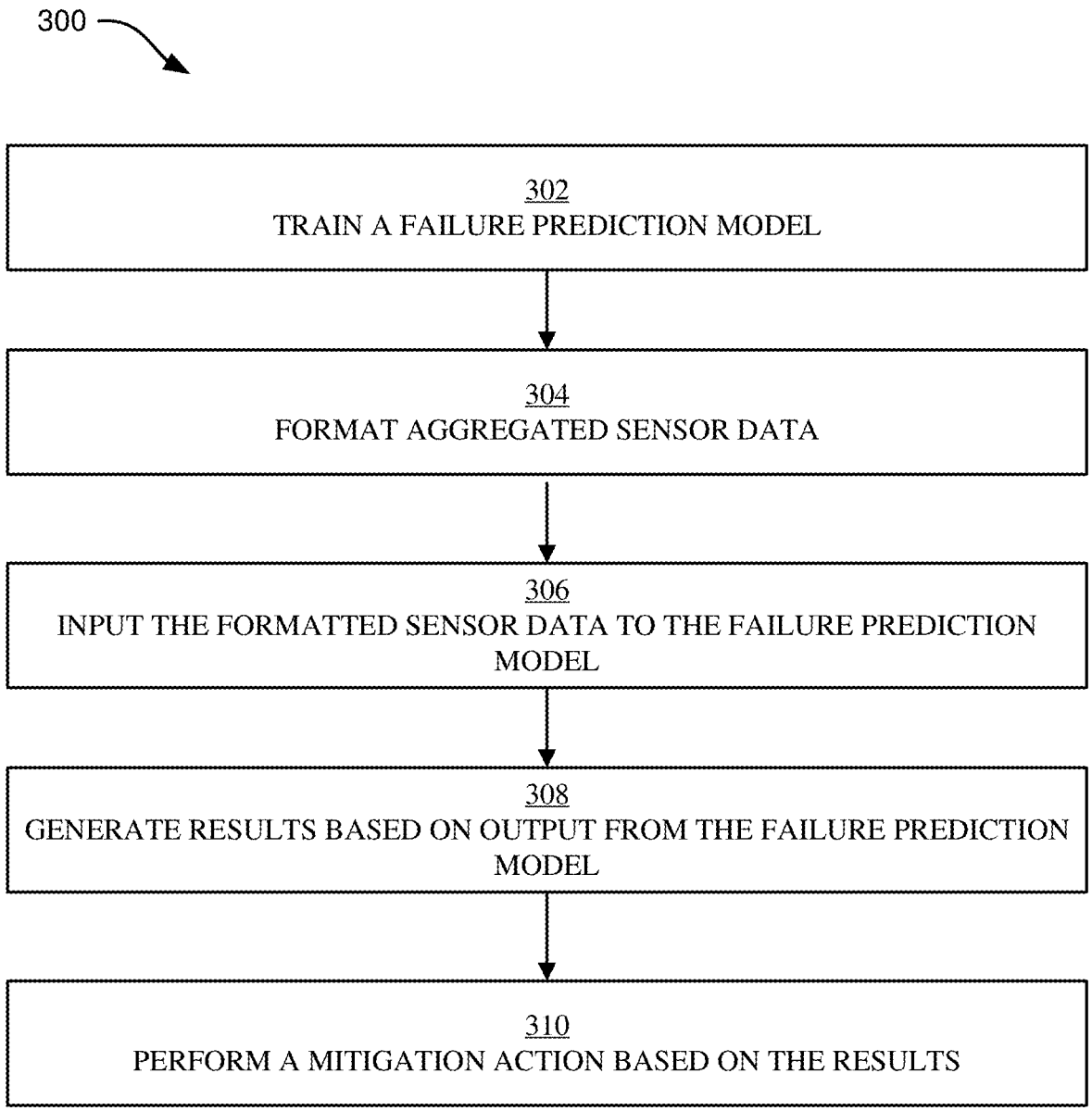
FIG. 3 illustrates a flowchart of an example method for predicting performance degradation with non-linear characteristics, in accordance with some embodiments of the present disclosure.

Referring now to FIG. 3, illustrated is a flowchart of an example method 300 for utilizing a failure prediction model 124, in accordance with some embodiments of the present disclosure. The method 300 can be implemented by, for example, the failure prediction model 124, a failure prediction system 102, a computer, a compute node, a processor, or another combination of hardware and/or software.

Operation 302 includes training a failure prediction model 124. Training a failure prediction model 124 can involve aspects previously discussed with respect to the training mode 200 of the failure prediction model 124. Operation 302 is discussed in more detail hereinafter with respect to FIG. 4.

Operation 304 includes formatting aggregated sensor data 118 into formatted sensor data 120. In some embodiments, formatted sensor data 120 is consistent with windowed data samples 230. Operation 304 can include applying a look-back window 212 to respective data points in the aggregated sensor data 118 in order to generate the formatted sensor data 120. In some embodiments, operation 304 further includes other data cleansing and/or data formatting operations such as removing outliers, resolving null values, and so on.

Operation 306 includes inputting the formatted sensor data 120 to the failure prediction model 124. Operation 308 includes generating results 122 based on output from the failure prediction model 124. In some embodiments, the results 122 include a classification 232 (e.g., normal or indicative of future failure) and/or a failure signal 234 (e.g., a quantification related to the likelihood of a future failure).

Operation 310 includes performing a mitigation action based on the results. For example, the mitigation action can involve transmitting the results 122 to an endpoint application 106 in the form of a notification, a warning, a report, or another transmission. In some embodiments, operation 310 includes triggering a scheduling event related to maintenance of an asset 110, such as replacing, rebuilding, or otherwise maintaining the asset 110. In some embodiments, the scheduling event is based on the results 122. For example, a failure signal 234 above a threshold may trigger a maintenance event to be scheduled within a time window (e.g., within the prediction horizon 214). In some embodiments, the mitigation action can be related to logistical actions such as ordering any necessary replacement parts and sending any ordered replacement parts to a location associated with the asset 110.

Figure 4:
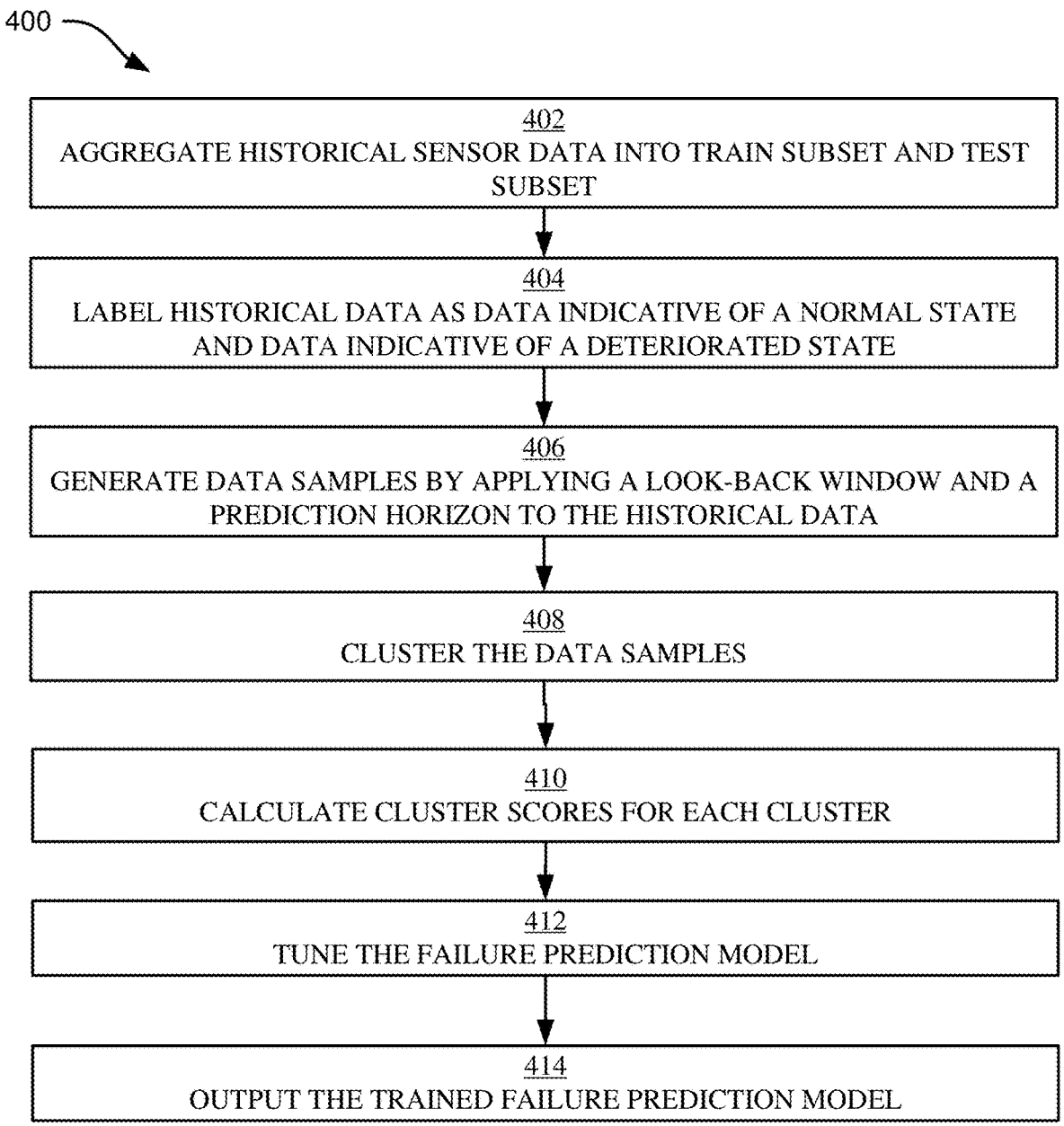
FIG. 4 illustrates a flowchart of an example method for training a failure prediction model, in accordance with some embodiments of the present disclosure.

Referring now to FIG. 4, illustrated is a flowchart of an example method 400 for training a failure prediction model 124, in accordance with some embodiments of the present disclosure. In some embodiments, the method 400 is a sub-method of operation 302 of FIG. 3. In some embodiments, the method 400 can be implemented by, for example, the failure prediction model 124, a failure prediction system 102, a computer, a compute node, a processor, or another combination of hardware and/or software.

Operation 402 includes aggregating historical data 202 into a train subset 204-1 and a test subset 204-2. Operation 404 includes labeling the historical data 202 to generate labeled historical data 206 including data indicative of a normal state 208-1 and data indicative of a deteriorated state 208-2. Operation 406 includes generating data samples associated with a normal state 216-1 and data samples associated with a deteriorated state 216-2 by applying a look-back window 212 and a prediction horizon 214 to respective data points in the historical data 202.

Operation 408 includes clustering the data samples 216 into a plurality of clusters 220. In some embodiments, operation 408 utilizes K-Means clustering. Operation 410 includes calculating cluster scores 222 associated with each of the clusters 220. The cluster scores 222 can include a respective normalcy score 224 and a respective anomaly score 226 for each respective cluster in clusters 220.

Operation 412 includes tuning the failure prediction model 124. Tuning the failure prediction model 124 can include, for example, (i) modifying the labeled historical data 206 by altering definitions of data indicative of a normal state 208-1 and data indicative of a deteriorated state 208-2; (ii) altering the size of the look-back window 212; (iii) altering the size of the prediction horizon 214; (iv) altering parameters associated with the clusters 220 (e.g., number of clusters, shapes of clusters, sizes of clusters, etc.); and/or other model tuning techniques and/or strategies. In some embodiments, the failure prediction model 124 is tuned based on results from testing the test subset 204-2.

Operation 414 includes outputting the trained failure prediction model 124. In some embodiments, outputting the trained failure prediction model 124 includes storing the trained failure prediction model 124 in a computer-readable storage medium such as, for example, a virtually provisioned model container 114.

Figure 5A:
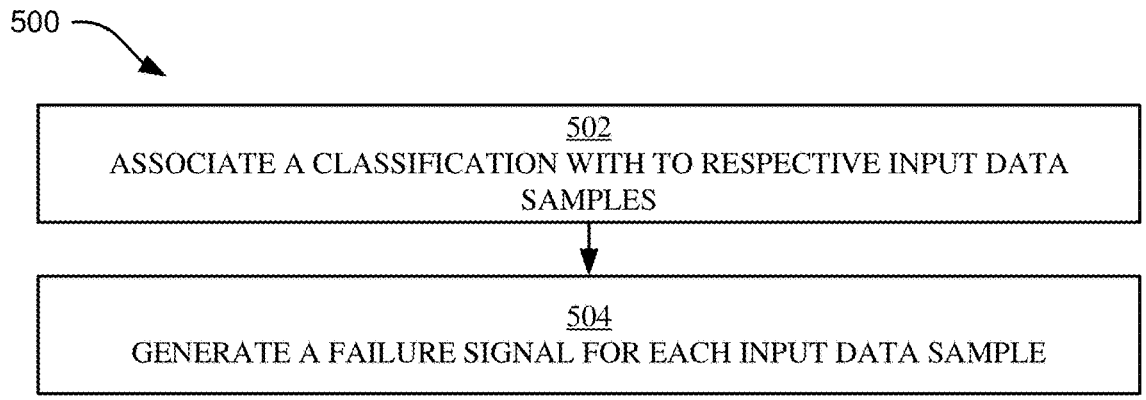
FIG. 5A illustrates a flowchart of an example method for generating results based on output from a failure prediction model, in accordance with some embodiments of the present disclosure.

Referring now to FIG. 5A, illustrated is a flowchart of an example method 500 for generating results based on output from a failure prediction model 124, in accordance with some embodiments of the present disclosure. In some embodiments, the method 500 is a sub-method of operation 308 of FIG. 3. In some embodiments, the method 500 can be implemented by, for example, the failure prediction model 124, a failure prediction system 102, a computer, a compute node, a processor, or another combination of hardware and/or software.

Operation 502 includes associating a binary classification outcome 232 to respective data samples (e.g., windowed data samples 230) that were previously input to the failure prediction model 124. In some embodiments, the classification 232 is either "normal" (e.g., 0) or "anomalous," "faulty," or another non-normal indicator (e.g., 1). The classification 232 can be based on the normalcy score 224 and the anomaly score 226 of the cluster 220 that captures a respective windowed data sample 230. More specifically, if the normalcy score 224 is larger than the anomaly score 226, then the corresponding windowed data sample 230 is considered normal. Conversely, if the anomaly score 226 is greater than the normalcy score 224, then the corresponding windowed data sample 230 is considered anomalous or otherwise indicative of failure.

Operation 504 includes generating a failure signal 234 for respective input data samples (e.g., windowed data samples 230). The failure signal 234 can be based on the normalcy scores 224, anomaly scores 226, and/or classifications 232 associated with the windowed data samples 230. In some embodiments, the failure signal 234 represents a more reliable indicator of truly anomalous data (e.g., it reduces false positives). The failure signal 234 is discussed in more detail hereinafter with respect to FIG. 5B.

Figure 5B:
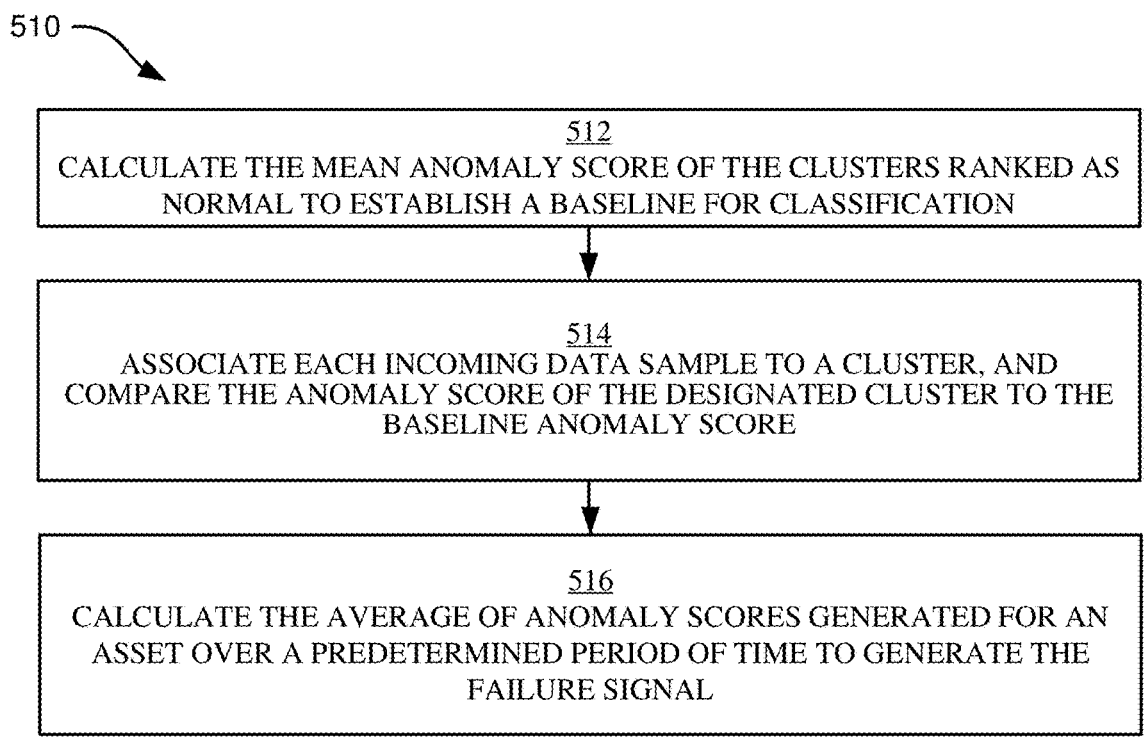
FIG. 5B illustrates a flowchart of an example method for calculating a failure signal, in accordance with some embodiments of the present disclosure.

Referring now to FIG. 5B, illustrated is a flowchart of an example method 510 for generating a failure signal 234, in accordance with some embodiments of the present disclosure. In some embodiments, the method 510 is a sub-method of operation 504 of FIG. 5A. In some embodiments, the method 510 can be implemented by, for example, the failure prediction model 124, a failure prediction system 102, a computer, a compute node, a processor, or another combination of hardware and/or software.

Operation 512 includes calculating a mean anomaly score of clusters 220 ranked as normal. Calculating the mean anomaly score during normal operations can involve averaging the anomaly scores 226 for each cluster of clusters 220 where the normalcy score 224 is greater than the anomaly score 226. This can be beneficial insofar as it establishes a baseline anomaly level which can function to reduce false positives.

Operation 514 includes allocating an incoming windowed data sample 230 to a cluster 220 associated with an anomaly score 226 and a normalcy score 224. If the anomaly score of the designated cluster is greater than the average anomaly score during normal operations (as determined in operation 512), that data sample is classified as being in failure mode (classified as 1), else the data sample is classified as being in normal model (classified as 0).

Operation 516 includes calculating the failure signal 234 as the average of the binary 0 or 1 classification outcomes for that asset over a predetermined period of time (e.g., 10 days) or a predetermined number of windowed data samples 230. In some embodiments, operation 516 can utilize Equation 3.

Referring again to FIGS. 1-5, one particular application of aspects of the present disclosure relates to detecting wear-induced performance degradation of rotors in progressing cavity pumps (PCPs). Wear-induced performance degradation of rotors in PCPs is a non-linear phenomenon, thus, aspects of the present disclosure are well-suited to accurately predict wear-induced rotor degradation in PCPs.

Artificial lift systems utilizing PCPs enable various non-thermal oil and gas recovery methods such as cold heavy oil production with sand (CHOPS). PCPs are capable of lifting viscous mixtures of oil and sand from an underground reservoir to the surface with improved lifting costs, improved maintenance costs, improved application flexibility, and decreased environmental impact compared to other artificial lift systems (e.g., electric submersible pump (ESP)).

In spite of the suitability of PCPs for handling higher sand content in heavy oil, one issue resulting from constant sand ingestion is abrasive wear failure. Abrasive wear can refer to the progressive degradation in pump performance as the hard chrome plating on the rotor becomes worn, and it is the most common type of failure in PCPs. This wear can be limited to the surface of the chrome plating on the rotor or extend to the base metal. In either case, the original rotor profile is changed. This change in profile can influence the PCP's performance insofar as the fit between the rotor and stator is changed. Acute abrasive wear in which the hard chrome plating is worn down to base metal can permanently damage the elastomer in the rotor and necessitate pump replacement.

Pump failures in oil wells are costly in terms of lost production time. Thus, the ability to predict a pump wear failure reduces these costs by providing proactive, scheduled maintenance for PCPs prior to failure. Furthermore, improved awareness of the pump performance degradation during the early phases of wear may help operators make proper adjustments in operational decisions to elongate run-life.

However, predicting failures in PCPs is challenging for similar reasons as predicting any performance degradation having non-linear characteristics. For one, the failure mechanism is gradual which raises issues in properly labeling historical data as "normal" or "anomalous" since a PCP may remain functional at sub-optimal performance for an extended period of time while the rotor becomes increasingly worn. Another challenge relates to the imbalanced set of historical data (e.g., significantly more normal data than anomalous data) available for PCPs. Yet another challenge relates to the variable failure mechanism which varies by operational environment (e.g., geologic formations including higher sand content compared to geologic formations with lower sand content). Accordingly, accurately predicting PCP failure is difficult. Nonetheless, aspects of the present disclosure, when implemented in the field of predictive monitoring for PCPs, can accurately predict PCP performance degradations due to wear-related mechanisms.

For example, returning again to the discussion of FIG. 4 as it relates to training a failure prediction model 124 for an asset 110 such as a PCP, operation 402 can aggregate sensor data such as pump speed, pump torque, casing pressure, and production rate. The aggregated sensor data can be separated into a train subset 204-1 (e.g., approximately 80% of the data) and a test subset 204-2 (e.g., approximately 20% of the data). Operation 404 can label the historical data as data indicative of a normal state 208-1 (approximately 97% of the imbalanced data in the train subset 204-1) or data indicative of a deteriorated state 208-2 (approximately 3% of the imbalanced data in the train subset 204-1). In some embodiments, the data indicative of a deteriorated state 208-2 can be any data between 25 days and 3 days prior to a known PCP replacement date (as determined from maintenance records), while data prior to 25 days before a known PCP replacement date can be considered data indicative of a normal state 208-1.

Operation 406 can generate data samples 216 by applying a look-back window 212 and a prediction horizon 214 to respective data points. Operation 408 can cluster the data samples 216 using K-Means clustering, and operation 410 can calculate normalcy scores 224 and anomaly scores 226 according to Equation 1 and Equation 2, respectively. Operation 412 can tune the failure prediction model 124 and operation 414 can output the trained failure prediction model 124.

Figure 6A:
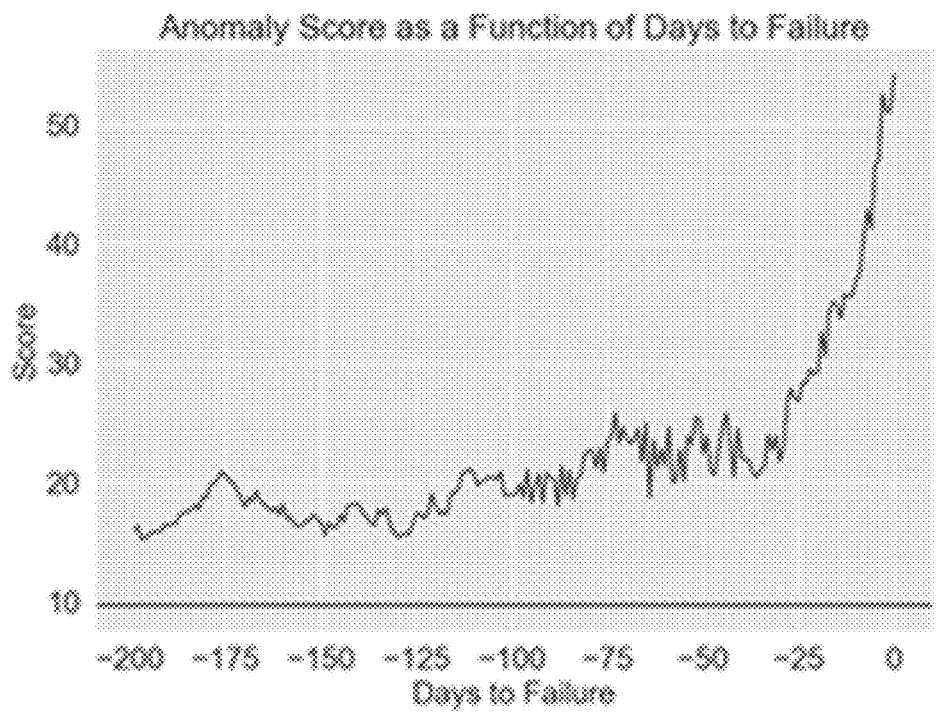
FIG. 6A illustrates experimental results of a graph of a cumulative anomaly score as a function of days to failure, in accordance with some embodiments of the present disclosure.

Applying the test subset 204-2 to the trained failure prediction model 124 of the PCP application demonstrates the utility of aspects of the present disclosure. FIG. 6A illustrates experimental results of a graph of cumulative anomaly scores 226 (y-axis) as a function of days to a known pump replacement date (x-axis). As can be seen, the trend line increases sharply between 25 days before failure and the known pump replacement date. Accordingly, FIG. 6A demonstrates anomaly scores 226 can be used to successfully predict PCP failures.

Figure 6B:
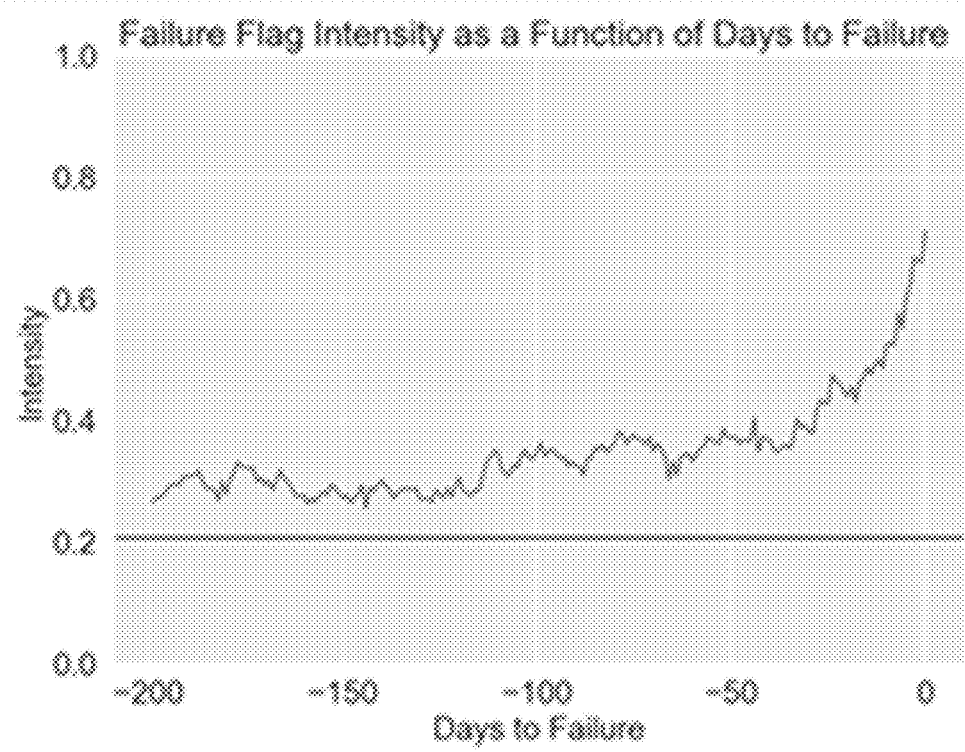
FIG. 6B illustrates experimental results of a graph of an intensity of a failure label as a function of days to failure, in accordance with some embodiments of the present disclosure.

FIG. 6B illustrates experimental results of a graph of the intensity of a classification 232 indicating failure (y-axis) as a function of days to failure (x-axis). As can be seen, the intensity of the classification 232 indicating failure rises significantly between approximately 25 days before failure and the known pump replacement date. Accordingly, FIG. 6B demonstrates that classifications 232 can be successfully used to predict PCP failures.

Notably, although a graph is not provided related to the failure signal 234, it is apparent to one skilled in the art that the failure signal 234 demonstrates similar predictive power with decreased noise relative to the results illustrated in FIGS. 6A and 6B. This is because the failure signal 234 represents an average score whereas FIG. 6A illustrates a cumulative score and FIG. 6B illustrates an intensity score.

FIG. 7 illustrates experimental results related to confusion matrices for various periods of time before a known pump replacement date using the test subset 204-2 for a PCP failure prediction model 124 as discussed above. As shown in FIG. 7, 30 days prior to failure 700-1, the normal (actual label 702-1)-normal (predicted label 704-1) box is 0.76, the faulty-normal box is 0.38, the normal-faulty box is 0.24, and the faulty-faulty box is 0.62. For 14 days prior to failure 700-2, the normal (actual label 702-2)-normal (predicted label 704-2) box is 0.76, the faulty-normal box is 0.26, the normal-faulty box is 0.24, and the faulty-faulty box is 0.74. For 5 days prior to failure 700-3, the normal (actual label 702-3)-normal (predicted label 704-3) box is 0.76, the faulty-normal box is 0.12, the normal-faulty box is 0.24, and the faulty-faulty box is 0.88.

Generally, FIG. 7 illustrates improving predictive performance as a function of nearness to an actual pump replacement date. Furthermore, FIG. 7 illustrates a recall (e.g., true positives divided by the total of true positives and false negatives) of approximately 88% at 5 days prior to failure 700-3, approximately 75% at 14 days prior to failure 700-2, and approximately 62% at 30 days prior to failure 700-1. Meanwhile, aspects of the present disclosure realized a precision (e.g., true positives divided by a total of true positives and false positives) of approximately 78% (5 days prior to failure 700-3), 76% (14 days prior to failure 700-2), and 72% (30 days prior to failure 700-1). Accordingly, FIG. 7 demonstrates that aspects of the present disclosure realize a robust failure prediction model 124 for predicting PCP performance degradation as a result of rotor wear.

Figure 8:
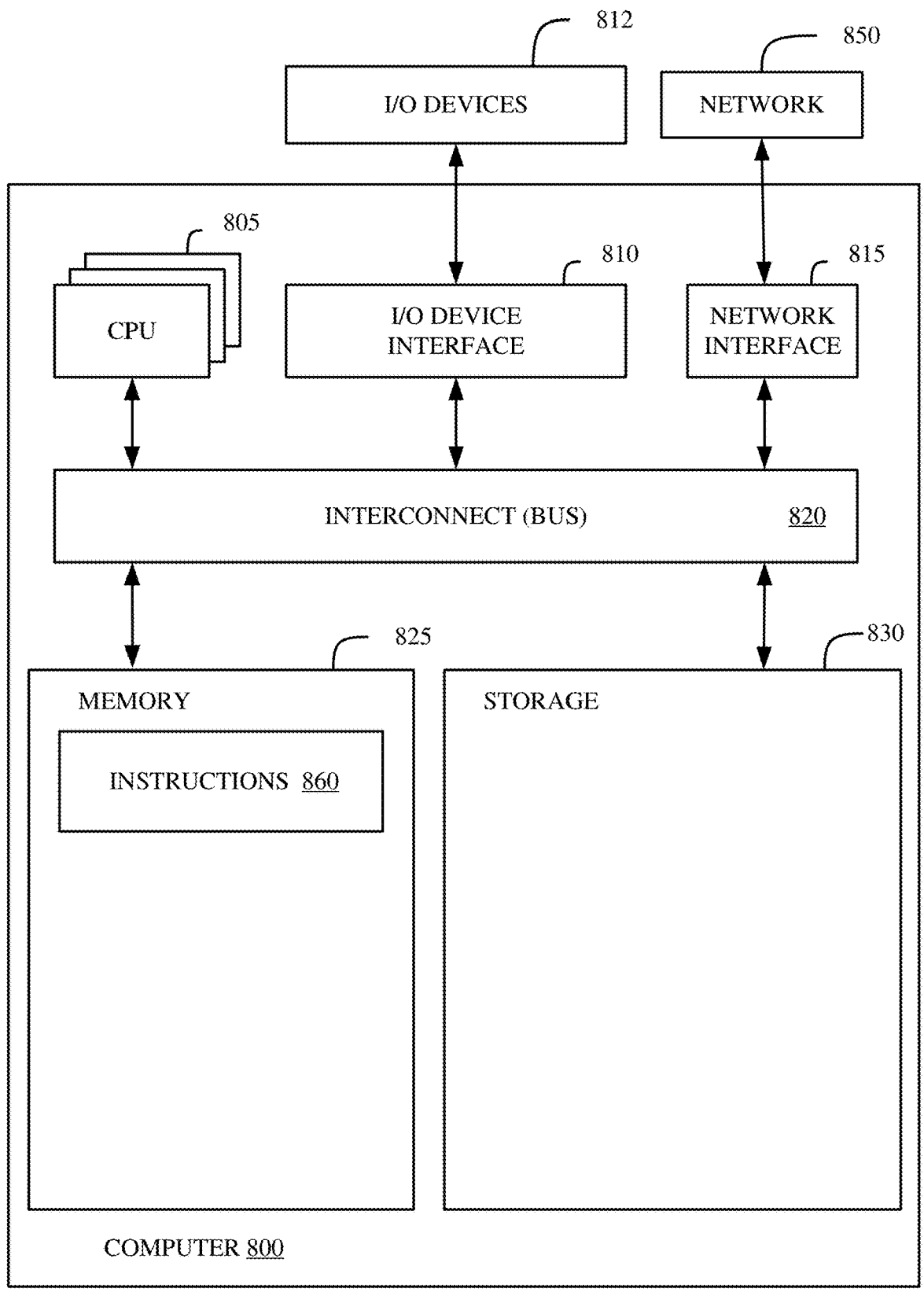
FIG. 8 illustrates a block diagram of an example computer, in accordance with some embodiments of the present disclosure.

FIG. 8 illustrates a block diagram of an example computer 800 in accordance with some embodiments of the present disclosure. In various embodiments, computer 800 can perform any or all of the method described in FIGS. 3-5 and/or implement the functionality discussed in any one of FIGS. 1-2 and/or 6-7. In some embodiments, computer 800 receives instructions related to the aforementioned methods and functionalities by downloading processor-executable instructions from a remote data processing system via network 850. In other embodiments, computer 800 provides instructions for the aforementioned methods and/or functionalities to a client machine such that the client machine executes the method, or a portion of the method, based on the instructions provided by computer 800. In some embodiments, the computer 800 is incorporated into (or functionality similar to computer 800 is virtually provisioned to) the failure prediction system 102 of FIG. 1, the failure prediction model 124 of FIG. 1, or another aspect of the present disclosure.

Computer 800 includes memory 825, storage 830, interconnect 820 (e.g., BUS), one or more CPUs 805 (also referred to as processors herein), I/O device interface 810, I/O devices 812, and network interface 815.

Each CPU 805 retrieves and executes programming instructions stored in memory 825 or storage 830. Interconnect 820 is used to move data, such as programming instructions, between the CPUs 805, I/O device interface 810, storage 830, network interface 815, and memory 825. Interconnect 820 can be implemented using one or more busses. CPUs 805 can be a single CPU, multiple CPUs, or a single CPU having multiple processing cores in various embodiments. In some embodiments, CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random-access memory (e.g., static random-access memory (SRAM), dynamic random access memory (DRAM), or Flash). Storage 830 is generally included to be representative of a non-volatile memory, such as a hard disk drive, solid state device (SSD), removable memory cards, optical storage, or flash memory devices. In an alternative embodiment, storage 830 can be replaced by storage area-network (SAN) devices, the cloud, or other devices connected to computer 800 via I/O device interface 810 or network 850 via network interface 815.

In some embodiments, memory 825 stores instructions 860. However, in various embodiments, instructions 860 are stored partially in memory 825 and partially in storage 830, or they are stored entirely in memory 825 or entirely in storage 830, or they are accessed over network 850 via network interface 815.

Instructions 860 can be computer-readable and computer-executable instructions for performing any portion of, or all of, the methods of FIGS. 3-5 and/or implement the functionality discussed in FIGS. 1-2 and/or 6-7. In some embodiments, instructions 860 can be referred to as a non-linear performance degradation prediction protocol (or instructions, mechanism, etc.) or a failure prediction protocol (or instructions, mechanism, etc.). Although instructions 860 are shown in memory 825, instructions 860 can include program instructions collectively stored across numerous computer-readable storage media and executable by one or more CPUs 805.

In various embodiments, I/O devices 812 include an interface capable of presenting information and receiving input. For example, I/O devices 812 can present information to a user interacting with computer 800 and receive input from the user.

Computer 800 is connected to network 850 via network interface 815. Network 850 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
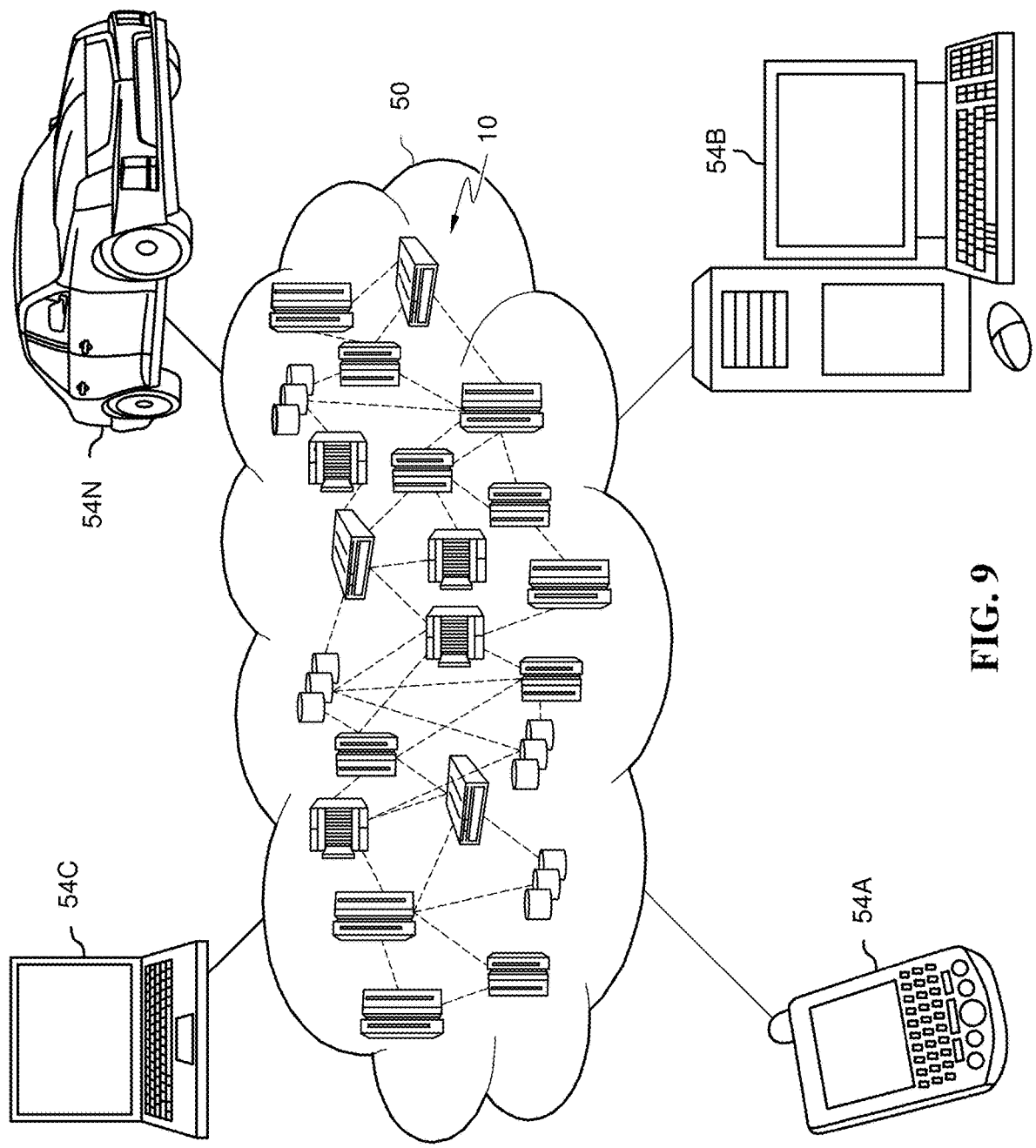
FIG. 9 depicts a cloud computing environment, in accordance with some embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
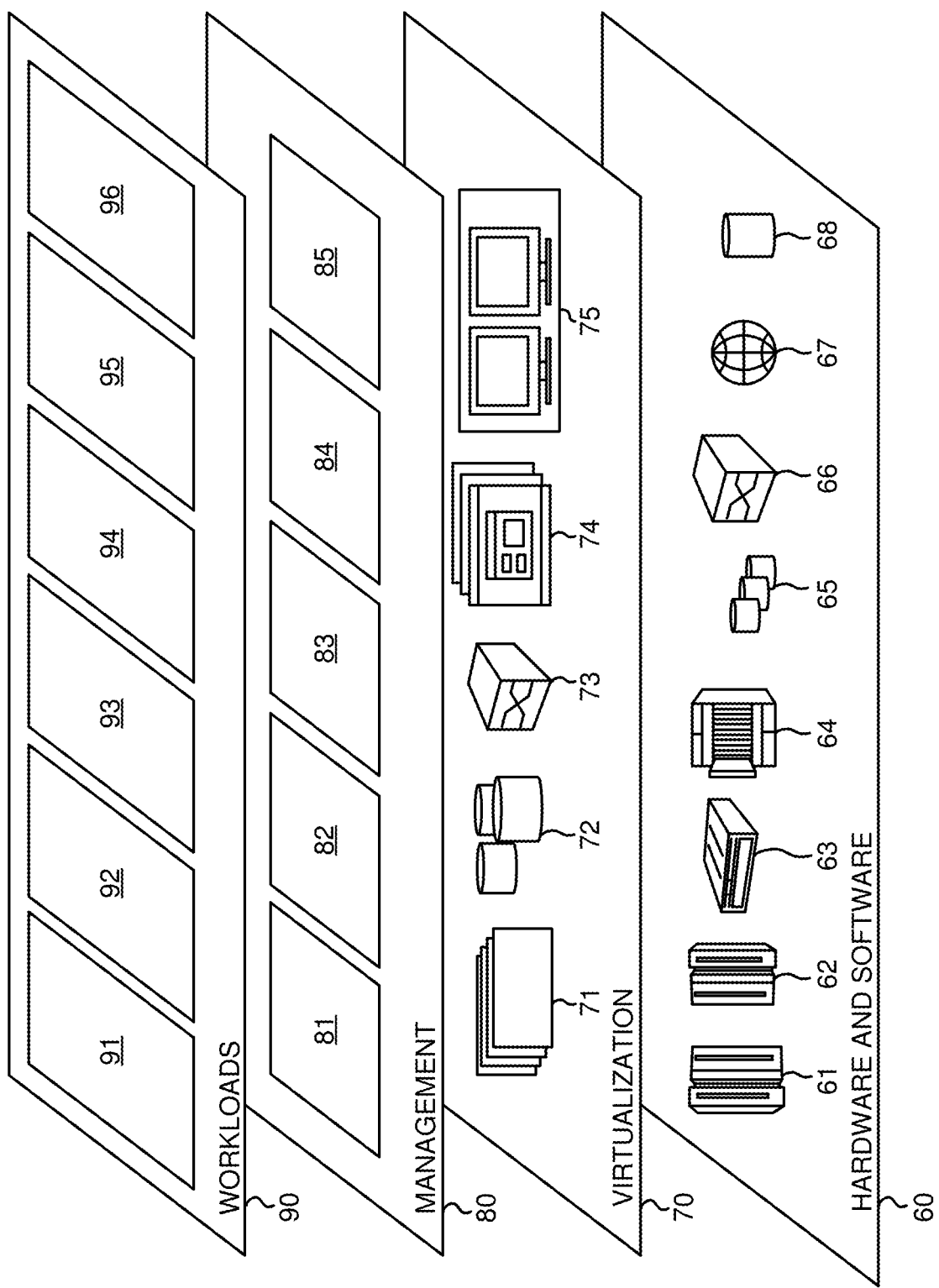
FIG. 10 depicts abstraction model layers, in accordance with some embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and non-linear performance degradation prediction 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 860 of FIG. 8 and/or any software configured to perform any portion of the method described with respect to FIGS. 3-5 and/or implement any portion of the functionality discussed in FIGS. 1-2 and/or 6-7) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes inputting a new data sample to a failure prediction model, wherein the failure prediction model is trained using a labeled historical dataset, wherein respective data points are associated with a look-back window and a prediction horizon to create respective training samples, wherein the respective training samples are clustered in a plurality of clusters, and wherein the plurality of clusters are each associated with a normalcy score and an anomaly score; and outputting a classification associated with the new data sample based on comparing a first anomaly score of a first cluster of the plurality of clusters that includes the new data sample to an average anomaly score of clusters of the plurality of clusters having the normalcy score greater than the anomaly score.

Example 2 includes the method of example 1, including or excluding optional features. In this example, the classification is indicative of a likelihood of wear-related performance degradation of an asset associated with the new data sample.

Example 3 includes the method of any one of examples 1 to 2, including or excluding optional features. In this example, the look-back window defines a quantity of sequentially previous data points to include in each respective training sample.

Example 4 includes the method of any one of examples 1 to 3, including or excluding optional features. In this example, the prediction horizon defines a predefined amount of time in the future, and wherein respective labels of respective data points the predefined amount of time in the future are associated with the respective training samples.

Example 5 includes the method of any one of examples 1 to 4, including or excluding optional features. In this example, the respective training samples are clustered using K-Means clustering.

Example 6 includes the method of any one of examples 1 to 5, including or excluding optional features. In this example, the method is performed by a failure prediction system according to software that is downloaded to the failure prediction system from a remote data processing system. Optionally, the method further comprises: metering a usage of the software; and generating an invoice based on metering the usage.

Example 7 is a system. The system includes one or more processors; and one or more computer-readable storage media storing program instructions which, when executed by the one or more processors, are configured to cause the one or more processors to perform a method comprising: inputting a new data sample to a failure prediction model, wherein the failure prediction model is trained using a labeled historical dataset, wherein respective data points are associated with a look-back window and a prediction horizon to create respective training samples, wherein the respective training samples are clustered in a plurality of clusters, and wherein the plurality of clusters are each associated with a normalcy score and an anomaly score; and outputting a classification associated with the new data sample based on comparing a first anomaly score of a first cluster of the plurality of clusters that includes the new data sample to an average anomaly score of clusters in the plurality of clusters having the normalcy score greater than the anomaly score.

Example 8 includes the system of example 7, including or excluding optional features. In this example, the classification is indicative of a likelihood of wear-related performance degradation of an asset associated with the new data sample.

Example 9 includes the system of any one of examples 7 to 8, including or excluding optional features. In this example, the look-back window defines a quantity of sequentially previous data points to include in each respective training sample.

Example 10 includes the system of any one of examples 7 to 9, including or excluding optional features. In this example, the prediction horizon defines a predefined amount of time in the future, and wherein respective labels of respective data points the predefined amount of time in the future are associated with the respective training samples.

Example 11 includes the system of any one of examples 7 to 10, including or excluding optional features. In this example, the respective training samples are clustered using K-Means clustering.

Example 12 is a computer program product. The computer program product includes one or more computer readable storage media, and program instructions collectively stored on the one or more computer readable storage media, the program instructions comprising instructions configured to cause one or more processors to perform a method that includes inputting a new data sample to a failure prediction model, wherein the failure prediction model is trained using a labeled historical dataset, wherein respective data points are associated with a look-back window and a prediction horizon to create respective training samples, wherein the respective training samples are clustered in a plurality of clusters, and wherein the plurality of clusters are each associated with a normalcy score and an anomaly score; and outputting a classification associated with the new data sample based on comparing a first anomaly score of a first cluster of the plurality of clusters that includes the new data sample to an average anomaly score of clusters in the plurality of clusters having the normalcy score greater than the anomaly score.

Example 13 includes the computer program product of example 12, including or excluding optional features. In this example, the classification is indicative of a likelihood of wear-related performance degradation of an asset associated with the new data sample.

Example 14 includes the computer program product of any one of examples 12 to 13, including or excluding optional features. In this example, the look-back window defines a quantity of sequentially previous data points to include in each respective training sample.

Example 15 includes the computer program product of any one of examples 12 to 14, including or excluding optional features. In this example, the prediction horizon defines a predefined amount of time in the future, and wherein respective labels of respective data points the predefined amount of time in the future are associated with the respective training samples.

Example 16 includes the computer program product of any one of examples 12 to 15, including or excluding optional features. In this example, the respective training samples are clustered using K-Means clustering.

Example 17 is a computer-implemented method for predicting wear-related deterioration of progressing cavity pumps (PCPs), the method includes inputting a new data sample of a PCP to a model configured to predict wear-related deterioration of the PCP, wherein the model is trained using a labeled historical PCP dataset, wherein respective data points are associated with a look-back window and a prediction horizon to create respective training samples, wherein the respective training samples are clustered in a plurality of clusters, and wherein the plurality of clusters are each associated with a normalcy score and an anomaly score; and outputting a classification associated with the new data sample based on comparing a first anomaly score of a first cluster of the plurality of clusters that includes the new data sample to an average anomaly score of clusters in the plurality of clusters having the normalcy score greater than the anomaly score, wherein the classification is indicative of the wear-related deterioration of the PCP.

Example 18 is a computer-implemented method for predicting wear-related deterioration of progressing cavity pumps (PCPs), the method includes generating labeled historical data by performing binary labeling of historical data associated with one or more PCPs; generating a plurality of training data samples by applying a look-back window and a prediction horizon to respective data points of the labeled historical data; clustering the plurality of training data samples into a plurality of clusters; calculating cluster scores for respective clusters of the plurality of clusters; assigning a new data sample of a PCP to a first cluster of the plurality of clusters; and assigning a classification to the new data sample based on cluster scores associated with the first cluster, wherein the classification is indicative of a likelihood of future wear-related deterioration of the PCP.

Example 19 includes the method of example 18, including or excluding optional features. In this example, the labeled historical data is labeled as faulty for a predetermined period of time prior to a known pump replacement date.

Example 20 includes the method of any one of examples 18 to 19, including or excluding optional features. In this example, the labeled historical data comprises pump speed data, pump torque data, casing pressure data, production rate data, and maintenance records.

Example 21 includes the method of any one of examples 18 to 20, including or excluding optional features. In this example, calculating the cluster scores for the respective clusters further comprises: calculating a normalcy score for the first cluster, wherein the normalcy score is a first proportion of training data samples associated with a normal state in the first cluster divided by a second proportion of training data samples associated with the normal state in the plurality of training data samples; and calculating an anomaly score for the first cluster, wherein the anomaly score is a third proportion of training data samples associated with a deteriorated state in the first cluster divided by a fourth proportion of training data samples associated with the deteriorated state in the plurality of training data samples. Optionally, the classification is based on a larger value of the normalcy score or the anomaly score for the first cluster.

Example 22 includes the method of any one of examples 18 to 21, including or excluding optional features. In this example, the method includes generating a failure signal for the new data sample, wherein the failure signal comprises an average anomaly score for the new data sample over a predetermined number of prior data points. Optionally, generating the failure signal further comprises: calculating a mean anomaly score for clusters of the plurality of clusters having a normalcy score greater than an anomaly score; for each of the predetermined number of prior data points, associating a one value to data points having an anomaly score of the first cluster greater than the mean anomaly score, and associating a zero value to data points having an anomaly score of the first cluster less than the mean anomaly score; and calculating the failure signal as an average of the one values and zero values associated with each of the predetermined number of prior data points.

What is claimed is:

1. A computer-implemented method comprising:
   inputting a new data sample to a failure prediction model, wherein the failure prediction model is trained using a labeled historical dataset, wherein respective data points are associated with a look-back window and a prediction horizon to create respective training samples, wherein the respective training samples are clustered in a plurality of clusters, and wherein the plurality of clusters are each associated with a normalcy score and an anomaly score; and
   outputting a classification associated with the new data sample based on comparing a first anomaly score of a first cluster of the plurality of clusters that includes the new data sample to an average anomaly score of clusters of the plurality of clusters having the normalcy score greater than the anomaly score.

2. The method of claim 1, wherein the classification is indicative of a likelihood of wear-related performance degradation of an asset associated with the new data sample.

3. The method of claim 1, wherein the look-back window defines a quantity of sequentially previous data points to include in each respective training sample.

4. The method of claim 1, wherein the prediction horizon defines a predefined amount of time in the future, and wherein respective labels of respective data points the predefined amount of time in the future are associated with the respective training samples.

5. The method of claim 1, wherein the respective training samples are clustered using K-Means clustering.

6. The method of claim 1, wherein the method is performed by a failure prediction system according to software that is downloaded to the failure prediction system from a remote data processing system.

7. The method of claim 6, wherein the method further comprises:
metering a usage of the software; and
generating an invoice based on metering the usage.

8. A system comprising:
one or more processors; and
one or more computer-readable storage media storing program instructions which, when executed by the one or more processors, are configured to cause the one or more processors to perform a method comprising:
inputting a new data sample to a failure prediction model, wherein the failure prediction model is trained using a labeled historical dataset, wherein respective data points are associated with a look-back window and a prediction horizon to create respective training samples, wherein the respective training samples are clustered in a plurality of clusters, and wherein the plurality of clusters are each associated with a normalcy score and an anomaly score; and
outputting a classification associated with the new data sample based on comparing a first anomaly score of a first cluster of the plurality of clusters that includes the new data sample to an average anomaly score of clusters in the plurality of clusters having the normalcy score greater than the anomaly score.

9. The system of claim 8, wherein the classification is indicative of a likelihood of wear-related performance degradation of an asset associated with the new data sample.

10. The system of claim 8, wherein the look-back window defines a quantity of sequentially previous data points to include in each respective training sample.

11. The system of claim 8, wherein the prediction horizon defines a predefined amount of time in the future, and wherein respective labels of respective data points the predefined amount of time in the future are associated with the respective training samples.

12. The system of claim 8, wherein the respective training samples are clustered using K-Means clustering.

13. A computer program product comprising one or more computer readable storage media, and program instructions collectively stored on the one or more computer readable storage media, the program instructions comprising instructions configured to cause one or more processors to perform a method comprising:
inputting a new data sample to a failure prediction model, wherein the failure prediction model is trained using a labeled historical dataset, wherein respective data points are associated with a look-back window and a prediction horizon to create respective training samples, wherein the respective training samples are clustered in a plurality of clusters, and wherein the plurality of clusters are each associated with a normalcy score and an anomaly score; and
outputting a classification associated with the new data sample based on comparing a first anomaly score of a first cluster of the plurality of clusters that includes the new data sample to an average anomaly score of clusters in the plurality of clusters having the normalcy score greater than the anomaly score.

14. The computer program product of claim 13, wherein the classification is indicative of a likelihood of wear-related performance degradation of an asset associated with the new data sample.

15. The computer program product of claim 13, wherein the look-back window defines a quantity of sequentially previous data points to include in each respective training sample.

16. The computer program product of claim 13, wherein the prediction horizon defines a predefined amount of time in the future, and wherein respective labels of respective data points the predefined amount of time in the future are associated with the respective training samples.

17. The computer program product of claim 13, wherein the respective training samples are clustered using K-Means clustering.

18. A computer-implemented method for predicting wear-related deterioration of progressing cavity pumps (PCPs), the method comprising:
inputting a new data sample of a PCP to a model configured to predict wear-related deterioration of the PCP, wherein the model is trained using a labeled historical PCP dataset, wherein respective data points are associated with a look-back window and a prediction horizon to create respective training samples, wherein the respective training samples are clustered in a plurality of clusters, and wherein the plurality of clusters are each associated with a normalcy score and an anomaly score; and
outputting a classification associated with the new data sample based on comparing a first anomaly score of a first cluster of the plurality of clusters that includes the new data sample to an average anomaly score of clusters in the plurality of clusters having the normalcy score greater than the anomaly score, wherein the classification is indicative of the wear-related deterioration of the PCP.

19. A computer-implemented method for predicting wear-related deterioration of progressing cavity pumps (PCPs), the method comprising:
generating labeled historical data by performing binary labeling of historical data associated with one or more PCPs;
generating a plurality of training data samples by applying a look-back window and a prediction horizon to respective data points of the labeled historical data;
clustering the plurality of training data samples into a plurality of clusters;
calculating cluster scores for respective clusters of the plurality of clusters;
assigning a new data sample of a PCP to a first cluster of the plurality of clusters; and
assigning a classification to the new data sample based on cluster scores associated with the first cluster, wherein the classification is indicative of a likelihood of future wear-related deterioration of the PCP.

20. The method of claim 19, wherein the labeled historical data is labeled as faulty for a predetermined period of time prior to a known pump replacement date.

21. The method of claim 19, wherein the labeled historical data comprises pump speed data, pump torque data, casing pressure data, production rate data, and maintenance records.

22. The method of claim 19, wherein calculating the cluster scores for the respective clusters further comprises:
   calculating a normalcy score for the first cluster, wherein the normalcy score is a first proportion of training data samples associated with a normal state in the first cluster divided by a second proportion of training data samples associated with the normal state in the plurality of training data samples; and
   calculating an anomaly score for the first cluster, wherein the anomaly score is a third proportion of training data samples associated with a deteriorated state in the first cluster divided by a fourth proportion of training data samples associated with the deteriorated state in the plurality of training data samples.

23. The method of claim 22, wherein the classification is based on a larger value of the normalcy score or the anomaly score for the first cluster.

24. The method of claim 19, the method further comprising:
   generating a failure signal for the new data sample, wherein the failure signal comprises an average anomaly score for the new data sample over a predetermined number of prior data points.

25. The method of claim 24, wherein generating the failure signal further comprises:
   calculating a mean anomaly score for clusters of the plurality of clusters having a normalcy score greater than an anomaly score;
   for each of the predetermined number of prior data points, associating a one value to data points having an anomaly score of the first cluster greater than the mean anomaly score, and associating a zero value to data points having an anomaly score of the first cluster less than the mean anomaly score; and
   calculating the failure signal as an average of the one values and zero values associated with each of the predetermined number of prior data points.

* * * * *